United States Patent

Bracken et al.

[11] Patent Number: 5,853,868
[45] Date of Patent: Dec. 29, 1998

[54] ELECTRICAL CONTACT MATERIAL FOR FLEXIBLE DOCTOR BLADE

[75] Inventors: Peter W. Bracken; Jeffery R. Brener; Martin V. DiGirolamo; Sam E. Mullinix, Jr.; Donald W. Stafford; Peter E. Wallin, all of Lexington, Ky.

[73] Assignee: Lexmark International, Inc., Lexington, Ky.

[21] Appl. No.: 923,773

[22] Filed: Sep. 2, 1997

Related U.S. Application Data

[63] Continuation of Ser. No. 623,362, Mar. 28, 1996, abandoned.

[51] Int. Cl.⁶ .................................................. G03F 15/08
[52] U.S. Cl. ........................ 428/323; 428/98; 428/141; 428/156; 428/174; 428/192; 428/212; 428/219; 428/220; 118/653; 118/657; 118/261; 118/259
[58] Field of Search ..................... 428/98, 141, 156, 428/174, 192, 212, 219, 220, 323; 118/653, 657, 259, 261

[56] References Cited

U.S. PATENT DOCUMENTS 4,642,202  2/1987  Railsback .................................. 252/511
5,085,171  2/1992  Aulick et al. ............................. 118/653
5,623,718  4/1997  Bracken et al. .......................... 399/284

FOREIGN PATENT DOCUMENTS 131 806 A  7/1978  Germany .......................... H01B 5/16

OTHER PUBLICATIONS

Japanese Patent Abstract, 04198271, Published Jul. 17, 1992.

Primary Examiner—Richard Weisberger
Attorney, Agent, or Firm—John A. Brady

[57] ABSTRACT

A conductive paste comprising a flexible elastomer, an electrically conductive particulate material and, optionally, a solvent is disclosed. This paste is used for providing flexible, electrically conductive bonding between materials. In a preferred embodiment, conductive paste of the present invention is used in a flexible doctor blade to provide bonding and an electrical connection between the support member and the portion of the blade which contacts the developer roller.

26 Claims, 2 Drawing Sheets

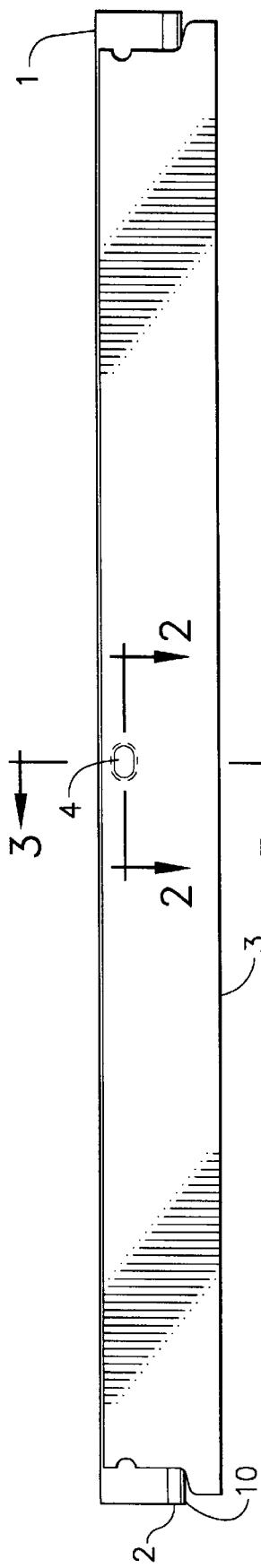
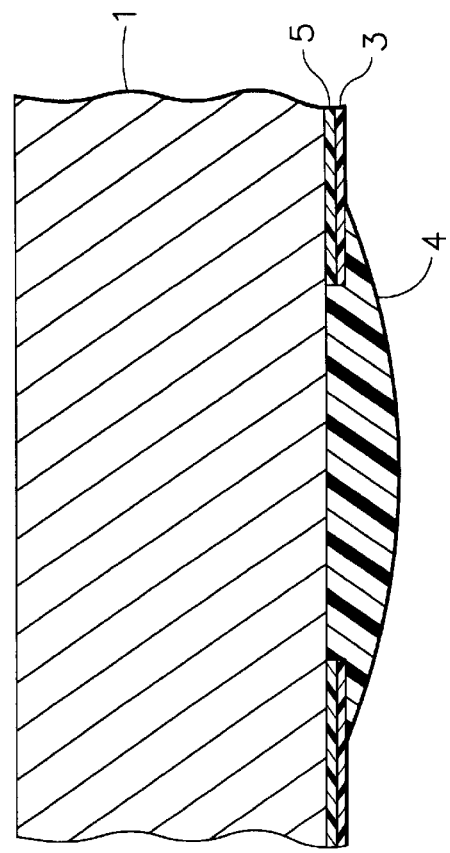

ELECTRICAL CONTACT MATERIAL FOR FLEXIBLE DOCTOR BLADE

CONTINUING APPLICATION

This application is a continuation of application Ser. No. 08/623,362, filed Mar. 28, 1996, now abandoned.

TECHNICAL FIELD

This invention relates to a component used in electrophotographic toner cartridges and, more particularly, relates to a flexible doctor blade which helps in transferring toner to a developer roller which, in turn, transfers the toner to a photoconductive surface carrying a latent image to be developed by the toner. Specifically, the present invention relates to an electrically conductive material used in making such doctor blades.

BACKGROUND OF THE INVENTION

Commercially available laser printers frequently employ an electrophotographic technique in which toner is charged and brought into contact with the surface of a rotating developer roller which carries metered toner into a nip contact with a photoconductor in the form of a drum having a photoconductive surface. The developer roller is semiconductive and charged to a potential between that on the toner and that on the charged areas of the photoconductor. As the developer roller rotates, toner is attracted to the developer roller surface from a supply source of toner.

When the developer roller surface has left contact with the toner supply and is rotating toward the nip contact with the photoconductor surface, it encounters a doctor blade which is in direct contact with the developer roller surface and which is charged to a potential of the same polarity as is desired for the toner passing under the doctor blade. The action of the doctor blade provides a controlled, thin layer of toner on the developer roller. This doctor blade in combination with the developer roller is the subject matter of an article entitled "Doctor Blade Design For Monocomponent Nonmagnetic Developer," in the IBM Technical Disclosure Bulletin, Vol. 33, No. 5, Oct., 1990, at Pages 14–15. The blade described in that article is steel and is slightly roughened on the surface contacting the developer roller. Toner brought to the blade is believed to have a significant portion charged in the opposite polarity to that intended for development. The interaction of the blade charged to the intended polarity and the mechanical effect of the contact between the blade and the developer roller results in the toner passing the blade to be highly predominant in the intended charge.

The purpose of the doctor blade, therefore, is twofold: (1) to uniformly meter a thin layer of toner onto the surface of the developer roller as it rotates, and (2) to assist with the uniform charging of the toner on the surface of the developer roller. The doctor blade should be designed so as to optimize the achieving of both of these objectives. The first objective is accomplished using mechanical force to press the doctor blade onto the developer roller, and surface roughness which limits the amount of toner that can pass under the blade. The second objective is accomplished by creating a voltage bias between the doctor blade and the developer roller so that current can flow through the toner.

The prior art doctor blade, described above, is rigid along its length and, therefore, provides a toner layer which varies in thickness with surface variations in the doctor blade itself and the developer roller it comes in contact with. Such variations in the toner layer result in corresponding variations in the visible image made by the printer. This can result in serious print quality defects, such as horizontal lines and bands. Therefore, an additional highly desirable characteristic of a doctor blade is flexibility at the doctoring nip which allows the blade to conform more fully to the irregular surface of the developer roller. This conformability creates a uniform pressure at the doctoring nip which causes more uniformity in the charging and flow of toner providing improved print quality when imaging gray scales.

Flexible doctor blades are known in the art. U.S. Pat. No. 5,085,171, Aulick, et al., issued Feb. 4, 1992, is directed to a compliant doctor blade having a thin metal outer layer on a flexible backing containing a grit surface which contacts the developer roller. The thin metal layer provides electrical conductivity between the blade and the developer roller. This blade, by being flexible rather than rigid as in the prior art doctor blades, conforms more closely to the surface of the developer roller it comes in contact with thereby providing a more uniform layer of toner on the roller. That doctor blade, however, although successfully used, has an effective life limited by the wearing away of the outer metal layer, since the metal provides the necessary electrical path between the doctor blade and the developer roller. Another problem arises from the conformation of this blade in use. Specifically, when the blade is used, the force of the sandpaper layer against the foam layer backing it results in the conductive sandpaper-developer roller nip becoming elongated and curved due to the compliance of the foam. This is in sharp contrast with the nip formed between a steel doctor blade and a developer roller. In that instance, since the steel is not flexible, it is unable to conform to the roller and remains flat in the nip area, providing a short flat nip. The net result of this deformation by the Aulick, et al. blade in the prenip and nip areas is erratic high and low toner flow. This erratic toner flow produces dark and light regions when printing gray scales and blacks.

An alternative flexible doctor blade design is described in U.S. Pat. No. 5,623,718, Bracken, et al., Extended Life Compliant Doctor Blade, filed Sep. 6, 1995. This structure modifies the Aulick, et al. doctor blade in two respects: (1) the layer which contacts the developer roller includes grit together with conductive filler material contained in a binder resin, rather than the Aulick, et al., thin metal layer on the grit surface; and (2) the supporting member of the blade extends the full height of the blade providing some rigidity around which the grit/conductive layer is bent to contact the roller (thereby minimizing compression of the foam at the nip corner and buildup of toner at that point). However, while this structure eliminates the tunnel shape pre-nip area, it does not change the long radius curved nip and the same erratic high and low toner flow problem results.

Concurrently filed patent application, Compliant Doctor Blade, Bracken, et al., describes a flexible doctor blade which effectively addresses this toner flow problem using a shim material having a specifically defined stiffness at the nip. This approach, however, while addressing and optimizing the toner flow aspect of the doctor blade, does not address the objective of having a doctor blade which provides uniform charge to the toner passing under the blade.

In the steel doctor blade of the prior art, described above, it is not difficult to ensure electrical continuity within the blade and between the blade and the developer roller because both the steel shaft of the blade and the flame sprayed doctoring surface are conductive and there is no insulating material between them. Therefore, applying a current to the steel shaft will allow that current to pass through the doctoring surface to the developer roller.

However, flexible doctor blades, as described above, can present a problem in terms of electrical conductivity. These blades contain an aluminum support bar and a conductive sandpaper component which contacts the developer roller. When the electric current is applied to the aluminum support bar, the flow of current to the conductive sandpaper must be assured in order to achieve the desired doctor blade performance. Electrical continuity must be maintained between the aluminum bar and the conductive sandpaper at all times. In the prior art flexible doctor blades, this is accomplished by using an electrically conductive tape which connects the aluminum support bar to the conducting sandpaper. However, such conductive tape is expensive and relatively difficult to work with. In addition, the tape is not reliable across all environments. The different components and materials which make up a flexible doctor blade have different coefficients of thermal expansion. When the blade heats and cools due to running and environmental conditions, the conductive tape can break loose from the sheer stresses caused by the different thermal expansion rates of these components. The resulting loss of electrical contact results in severe background in printed copies.

It, therefore, would be highly desirable to develop a conductive material, being reasonable in cost, which could form a strong, yet flexible, bond between the metal support bar portion of the doctor blade and the portion of the doctor blade which contacts the developer roller, while at the same time providing a durable electrical connection between those components.

SUMMARY OF THE INVENTION

The present invention relates to paste compositions used for providing electrically conductive bonds, for example, between the component parts of an electrically energized doctor blade. This paste comprises from about 70% to about 96% of an elastomer (such as a room temperature vulcanizable silicone) which has a hardness of less than about 50 Shore A when dry, and from about 4% to about 30% of a particulate electrically conductive material (such as carbon black) dispersed in said elastomer. The paste compositions may additionally comprise a solvent material (such as methyl ethyl ketone).

The present invention also provides for an electrically energized doctor blade for metering charged electrophotographic toner held on a developer roller by physically contacting a sector of said roller with a surface of said blade which is electrically charged, said blade comprising a compliant backing member, a supporting member to position said blade adjacent to said roller, and a layer on said compliant backing member comprising conducting means and a solid binder having dispersed throughout said binder grit particles, said compliant backing member carrying said conducting means and said layer with grit, being attached and electrically connected to said supporting member by a conductive paste comprising from about 70% to about 96% of an elastomer which has a hardness of less than about 50 Shore A when dry, and from about 4% to about 30% of a particulate electrically conductive material dispersed in said elastomer, said compliant backing member being bendable to extend under said support member to contact said layer with grit and said conducting means with said sector of said developer roller during use.

This paste not only provides a cost-effective strong and flexible electrical connection on the doctor blade, but it also conforms easily to irregularities in the doctor blade surface.

All percentages and ratios given herein are "by weight" unless otherwise specified.

BRIEF DESCRIPTION OF THE DRAWINGS

The details of one aspect of the present invention will be described in connection with the accompanying drawings in which FIG. 1 is a front view of a doctor blade which utilizes the conductive paste described herein, FIG. 2 is a cross-section of that doctor blade (taken along line 2—2)

DETAILED DESCRIPTION OF THE INVENTION

Paste Compositions

Figure 3:
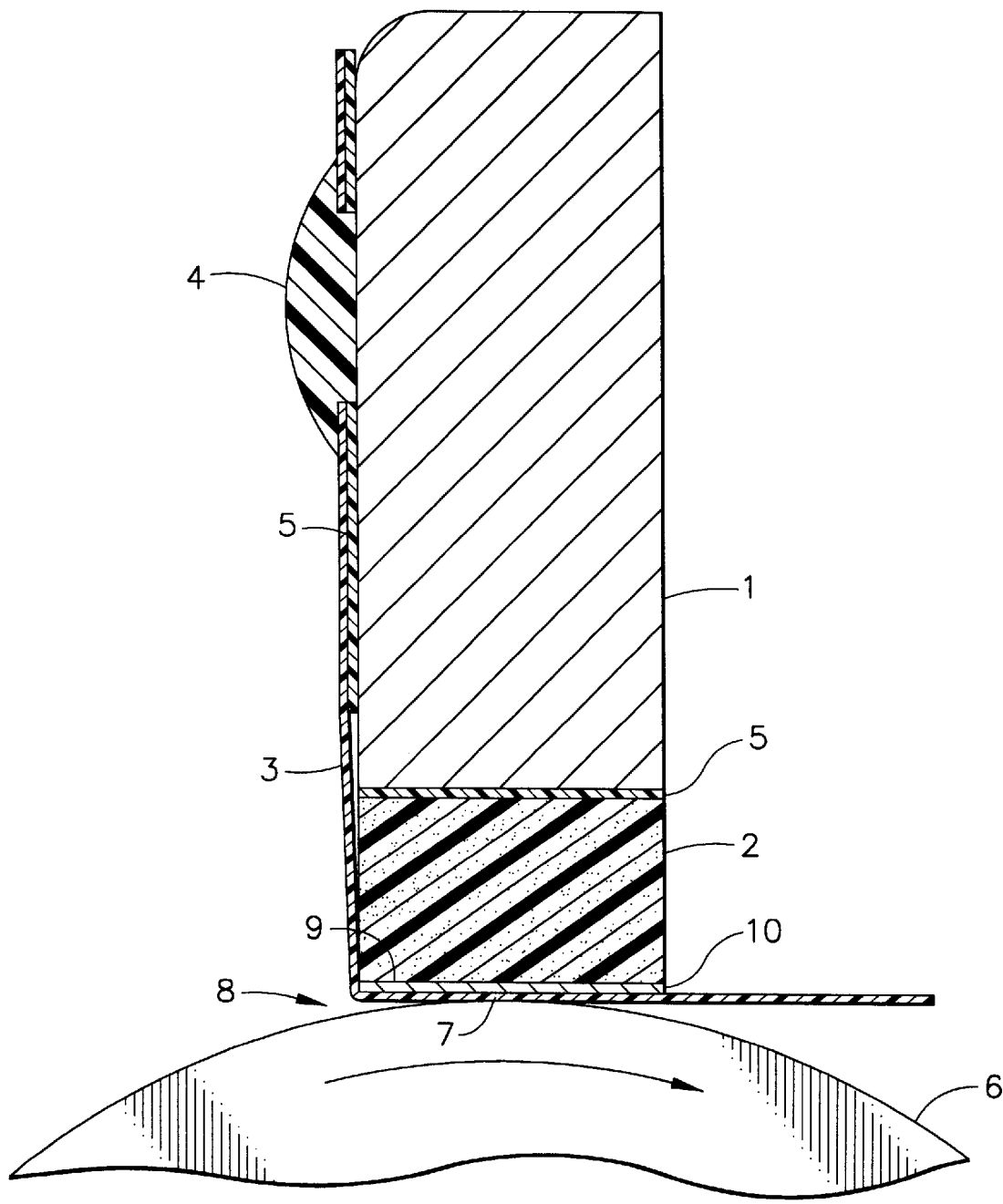
FIG. 3 is a cutaway side view of the doctor blade (taken along line 3—3) shown with the developer roller in operation.

The paste compositions of the present invention provide an effective way to provide a flexible, durable electrically conductive adhesive link between materials. Such compositions may be used, for example, in forming flexible doctor blades for use in electrophotographic processes. Such doctor blades will be described in detail below. In addition, the paste compositions can be used in any application where reliable electrical contact is desired over a wide range of environmental conditions. Examples of such uses include electrostatic discharge (ESD) and in preparing conductive cloth. When, for example, silicone is used as the elastomer component, the paste remains elastomeric from −40° C. to 200° C. and is immune to humidity effects.

The paste compositions contain from about 70% to about 96%, preferably from about 94% to about 96%, of an elastomer component, and from about 4% to about 30%, preferably from about 4% to about 6%, of an electrically conductive particulate material dispersed within that elastomer. The consistency and viscosity of the product formed may be varied depending upon the particular need involved. For example, by appropriate modification of the nature and amounts of the components a composition can be formulated which can be easily dispensed from a squeeze tube or one may be formulated which may be painted on the surface to be joined. In general, the composition is formulated as a flowable paste; not so runny that it will run off the surface it is applied to, but not so thick as to impede application on that surface. The viscosity of the paste generally is from about 50 cps to about 15,000 cps when applied. In addition to the elastomer and conductive material, the paste compositions of the present invention may also contain a solvent component. When a solvent is used, the paste compositions generally will contain from about 14% to about 36% elastomer, from about 4% to about 6% conductive material, and from about 58% to about 82% of the solvent. Such compositions generally contain from about 10% to about 50%, preferably from about 20% to about 40% solids (i.e., the elastomer and the conductive particulate material), and from about 50% to about 90%, preferably from about 60% to about 80% of the solvent.

Any conventional elastomer which remains flexible when dry and set may be used in the compositions of the present invention. Specifically, the elastomers utilized should be ones which have a hardness of less than about 50 Shore A when dry. Shore A is an ASTM standard test for determining rubber hardness. The test involves measuring the force/deflection of a spring attached to a probe which is pressed against the elastomer. By way of example, the elastomers used in conductive paints and inks would not be usable in the compositions of the present invention because, when dry, they do not maintain sufficient flexibility and, therefore, would crack and break apart during use in a doctor blade. Preferred elastomers are those which cure at room temperature. Examples of such materials include latex rubber (e.g., latex caulk), rubber cement (e.g., natural rubber in a toluene solvent), moisture-cured polyurethane elastomers, ultraviolet-cured acrylics and RTV silicones. Preferred elastomers are RTV silicones and latex rubber, with RTV silicones being particularly preferred. An elastomer material useful in the present invention is GE 118 RTV silicone adhesive, commercially available from General Electric.

The conductive materials utilized in the paste compositions of the present invention must be electrically conductive, particulate in nature, and easily dispersible in the elastomer component. It is also preferred that the conductive material be relatively inexpensive and provide a high electrical conductivity at relatively low loadings. The conductive material and the amount of that material is selected such that the paste when dry provides a maximum resistance of no greater than about $1 \times 10^5$ ohms/cm$^2$, preferably no greater than about $1 \times 10^2$ ohms/cm$^2$. Examples of conductive materials which may be used in the present invention include metal fillers, graphite, carbon black, and mixtures thereof. A preferred conductive material is carbon black, such as XE-2 carbon black, commercially available from Degussa.

A solvent may be added to the paste compositions of the present invention as an optional component to provide a composition which has particular viscosity or product drying times characteristics. For example, for some applications a less viscous paste product which can be painted onto the surface may be better suited for use than a thicker paste product which must be dispensed from a squeeze tube. Solvents useful in the present invention are conventional and are used at their art established levels. They will generally be chosen based on the properties of the particular elastomer utilized in the composition, as well as the evaporation characteristics and other properties desired for the composition. As the solvent evaporates, once the composition is applied, the elastomer cures and the paste forms an electrically conductive bond on the surface applied. Classes of solvents useful in the present invention include organic aliphatic or aromatic (generally non-chlorinated) solvents. Examples of particular solvents useful in the present invention include xylene, toluene, methyl ethyl ketone, butyl acetate, and mixtures thereof. Particularly preferred is methyl ethyl ketone.

The paste compositions of the present invention are formulated by mixing the elastomer and (if used) solvent components and then thoroughly dispersing the particulate conductive material in that mixture. The composition is stored in a manner which depends upon the particular components utilized.

For example, if an elastomer which cures on exposure to oxygen or on exposure to moisture is used, then the paste compositions formed from those elastomers should be stored in a container which is sealed to isolate the compositions from oxygen or moisture in the air.

The following is an example of a representative paste composition of the present invention.

EXAMPLE

A paste composition of the present invention, having the composition set forth below, is made in the following manner.

200 grams GE 118 RTV silicone adhesive, commercially available from General Electric 11 grams XE-2 carbon black, commercially available from Degussa 600 grams methyl ethyl ketone The carbon black is dispersed in a mixture of the elastomer and solvent components using steel shot and a paint shaker for 2 hours. The steel shot fills about 20% of the container volume. After mixing is completed, the solution is poured through a mesh screen to remove the steel shot. About 1 liter of paste is formed. Carbon black that is pre-dispersed in a solvent can be purchased. In that case, the pre-dispersed carbon black can be simply stirred into the elastomer solution.

The composition formed is easily dispensed using a cotton swab, syringe or brush. The composition is applied so that it contacts the surfaces which are intended to be joined, for example, the conductive sandpaper and the aluminum support bar of a doctor blade. The specific manner in which this composition is used in fabricating a flexible doctor blade will be discussed in detail below. As the methyl ethyl ketone evaporates and the area of application becomes dry to the touch (about 30 minutes after application), the elastomer begins to cure and is totally cured in about 24 hours. The composition has a hardness of about 40 Shore A when dry. The silicone uses moisture in the air to cure, so shelf life of the composition is from about 6 months to about 1 year or even longer, as long as the container containing the composition is sealed such that it is moisture-tight. As the material cures, it bonds together the aluminum bar and the sandpaper components of the doctor blade. The silicone is very flexible so it can withstand the thermal stresses inherent in doctor blade use (from about −20° F. to about 140° F.) without delaminating. The composition has a resistance of about $1 \times 10^2$ ohms/cm$^2$, which is sufficient to maintain electrical continuity on the doctor blade. The composition can be applied for less than about 1 cent per blade; a cost which is much lower than electrically conductive tape would be.

Substantially similar results are obtained when the above composition is modified such that it contains from about 14% to about 36% of the elastomer, from about 4% to about 6% of the carbon black, and from about 58% to about 82% of the solvent.

Doctor Blades

As indicated above, a particularly important use of the paste compositions of the present invention is in the manufacture of flexible doctor blades for use in electrophotographic processes. As shown in FIGS. 1, 2 and 3, the compliant doctor blades of the present invention comprise a support bar (1) of aluminum, preferably, for example, a 4.0 mm×10 mm aluminum 6063-T5 stock bar 231.5 mm in length. Extending the length of bar (1) is a laminate (3) which comprises a compliant backing member carrying on its outside surface (i.e., the surface which contacts the developer roller) a conducting means together with a solid binder having grit particles dispersed throughout the binder. In a preferred embodiment, the compliant backing member is a substrate of compliant polyethylene terephthalate polyester resin film having a thickness of from about 0.002 to about 0.005 inch (i.e., from about 0.051 to about 0.127 mm). Other materials which may be used as the compliant backing member include polyamide and paper. The solid binder which is carried on the compliant backing member is, in a preferred embodiment, a cured polyurethane (e.g., Z001, commercially available from Lord Chemical) having grit particles thoroughly dispersed throughout. These grit particles generally have a particle size of from about 8 to about 20, preferably from about 13 to about 16, micrometers in diameter and are preferably a ceramic oxide, such as silicon carbide (e.g., Norbide, commercially available from Norton Corp.). Other grit materials which are useful in the present invention include aluminum oxide, diamond powder, titanium dioxide, zirconium dioxide, and mixtures thereof.

The compliant backing member also carries a conducting means. This conducting means effectively takes the current which is applied to the doctor blade and conducts it to the developer roller. An example of such a conducting means which may be used in the present invention is the outer metal layer described in U.S. Pat. No. 5,085,171, Aulick, et al., issued Feb. 4, 1992, incorporated herein by reference. A preferred conducting means for use in the present invention is one where conductive particles are included in and dispersed throughout the solid binder layer carried by the compliant backing member. Conductive materials which may be used in the present invention include carbon black, graphite, metal filters, ionic salts, and mixtures thereof. The preferred conducting material is carbon black. The conducting particles included in the solid binder should provide the layer with an electrical resistance of less than about $2\times10^5$ ohms/cm$^2$.

Laminate (3) is held to bar (1) by any adhesive strong enough to withstand the forces on the laminate during use of the doctor blade. An example of such an adhesive is a commercial dual side adhesive tape (5) comprising 1 mil thick polyester having adhesive on both sides, with total thickness of 0.13 mm, width of 8.5 mm and length coextensive with the length of bar (1).

Developer roller (6) comprises a semiconductive, organic elastomer charged to a predetermined potential by a fixed potential source. Roller (6) is contacted with a supply of charged toner as it rotates clockwise. The toner is normally primarily charged to a polarity the same as the polarity of the roller while having a significant amount of toner charged to the opposite polarity. The sector of developer roller (6) encountering the doctor blade carries such toner, and the toner of opposite polarity is blocked by the charged doctor blade so that only a thin layer of toner passes the doctor blade and that thin layer is charged in great predominance to the correct polarity.

A relatively narrow band of the conductive paste of the present invention can be applied to span bar (1). This layer of conductive paste is generally from about 5 mm to about 15 mm, preferably about 10 mm, long and from about 4 mm to about 10 mm, preferably about 6 mm, wide. It is typically from about 0.025 to about 0.05 mm thick. This conductive layer runs from the laminate (3) on one side of the bar across the top of bar (1) and runs down the side of the bar opposite the laminate. This layer provides an electrical contact between the laminate (3) and bar (1). The layer generally has an electrical resistance of no greater than about $1\times10^5$ ohms/cm$^2$, preferably no greater than about $1\times10^2$ ohms/cm$^2$. Laminate (3) is charged through this layer of conductive paste in the same polarity as roller (6) by a fixed potential source which contacts the back of the layer. An alternative to this layer is to simply punch a hole in laminate (3) at the location where the electrical contact is to be made and fill that hole with the conductive paste (4) of the present invention, which is then cured to a solid. This latter embodiment is illustrated in the figures which accompany the present application.

In a preferred doctor blade structure, located on the bottom surface of support bar (1) (i.e., the face of the support bar which is facing the developer roller) is a layer of resilient foam (2) which generally has a thickness of from about 2 to about 3 mm and runs the entire length of the support bar (1). The foam layer (2) may be attached to the underside of the support bar using any conventional adhesive material which will withstand the forces on the doctor blade during use, but in a preferred embodiment this adhesive material is a commercial dual side tape (5) which comprises 1 mil thick polyester having adhesive on both sides. A preferred foam material for use in the present invention is Poron foam, a polyurethane foam commercially available from Rogers Corp.

Another preferred aspect of the doctor blade embodiment of the present invention is the attachment of a shim (10) to the bottom of the resilient foam layer (i.e., the face of the resilient foam layer which faces the developer roller). In selecting the shim it is important that it maintains an appropriate balance between stiffness and flexibility. Specifically, the shim must maintain stiffness in the process direction (i.e., the direction in which the developer roller is moving), yet maintain flexibility in the direction perpendicular to the process direction (i.e., over the length of the doctor blade). It is the stiffness of the shim which provides the appropriate nip configuration in use, while the flexibility over the length of the doctor blade allows the blade to conform closely to the surface of the developer roller. Thus, the doctor blade in this embodiment provides the benefits of both an inflexible steel doctor blade and a flexible doctor blade. This embodiment is described in greater detail in concurrently filed patent application entitled Compliant Doctor Blade, Bracken, et al. Any material which maintains this appropriate flexibility/stiffness balance may be used as the shim in the present invention. In deciding whether a particular material is appropriate for use as the shim, both the nature of the material and its thickness will be important. Specifically, if a material is too thin it may not provide the appropriate degree of stiffness required, while if it is too thick it may not exhibit the required degree of flexibility. The shim may be made of any material having the required flexibility/stiffness tradeoff and is preferably a material that does not corrode and has an appropriate cost. Examples of materials which may be used include brass, polyester, phosphorus bronze, beryllium copper, polycarbonate, and stainless steel. Polyester is a useful material because it is easier than the metals to cut into the desired shape. Stainless steel is a particularly preferred material because of its attractive cost and the fact that it doesn't corrode.

By way of example, when stainless steel is used to make the shim, a thickness below about 0.004 inch (0.102 mm) makes the shim too fragile. When polyester (e.g., Mylar, commercially available from DuPont) is used, a thickness of material below about 0.014 inch (0.356 mm) makes the material too flexible; greater stiffness is required. On the other hand, stainless steel at a thickness of greater than about 0.012 inch (0.305 mm) is too thick and does not provide the required degree of flexibility. Thus, the thickness for the shim material selected is purely a function of the stiffness/flexibility tradeoff required. The shim material utilized in the doctor blades of the present invention should have a stiffness of from about 0.5 to about 31.0, preferably from about 10.0 to about 25.0, inches of deflection/inch of length/pound of force. This stiffness is measured as follows: a 4 mm wide shim is fixed at one end and loaded at the other (the magnitude of the lead should be sufficiently low to prevent plastic deformation of the shim); the displacement of the loaded end is then measured. Put another way, the shim should have a stiffness which is greater than that of 0.014 inch thick polyester and less than or equal to that of 0.012 inch thick stainless steel.

The placement of the shim (10) on the foam layer (2) is important. Specifically, the shim (10) should be aligned with the front edge (9) of the doctor blade (i.e., the edge of the doctor blade which the developer roller encounters first in use). The shim (10) should run the entire length of the doctor blade. It is fastened onto the foam layer (2) using an adhesive that cures and sets up over time. It is important that the adhesive not allow the shim to creep or shift position in use. This is particularly important since the shim will be under constant shear stress during use. Examples of useful adhesives include acrylic adhesives. It is preferred that the shim be fastened to the foam using an acrylic adhesive (e.g., #9469 Double Sided Tape commercially available from 3M). It is not necessary that the shim cover the entire bottom face of the foam layer, as long as it is placed at and aligned with the front edge (9) of the foam layer (2). However, it is preferred that the shim be of such size and placement that it covers the entire bottom face area of the foam layer since that makes assembly and alignment of the doctor blade much easier.

The doctor blade of the present invention may be formed in an embodiment where a portion of the support bar (1) extends down along the foam layer (2) and ends in a position aligned with the shim (10) such that it forces the laminate (3) to turn substantially directly toward the nip areas at the base of that extension of the bar, resulting in a reduction in the size of the wedge areas between the doctor blade and the developer roller where toner can accumulate. This type of structure is described in U.S. patent application Ser. No. 08/524,275, Bracken, et al., Extended Life Compliant Doctor Blade, filed Sep. 6, 1995.

The resilient foam layer (2) may be made from any commercially available foam having the appropriate degree of resilience. Preferably, the foam (2) is a commercially available polyurethane foam having a density of about 20 lbs. per cubic foot. The foam (2) is held in place by a double side adhesive tape (5) which is approximately 4 mm in width and 0.013 mm thick. Various alternatives to foam (2) may be readily employed. In use, when the laminate on the compliant backing member (3) is bent back as described, the inherent resilience of the foam material and the backing member provides the force for the laminate layer (3) toward the roller (6).

A preferred laminate (3) is made by curing a slurry of a thorough mixture of silicon carbide grit, conductive carbon black and polyurethane-based adhesive applied as a thin coating (e.g., from about 25 to about 35 microns thick) to the resin substrate (i.e., the compliant backing member) which may be from about 0.002 to about 0.005 inch (i.e., about 0.051 to about 0.127 mm) thick. This slurry is cured to form a conductive layer. The carbon black provides the conductivity. Type XE-2 carbon black, commercially available from Degussa, is preferred for use in the present invention. A peak response in electrical properties is obtained by loading about 5% by volume of carbon black in the slurry, which results in an electrical resistance less than about $2\times10^5$ ohms/cm$^2$, preferably less than about $1\times10^5$ ohms/cm$^2$. Loading higher than about 5% by weight results in a surface roughness which is too smooth for the correct metering of toner, regardless of the size of the abrasive particles used.

There is a peak response in the doctoring performance using abrasive particles in the 13–16 micrometer diameter range. This grit size yields an average roughness of from about 0.9 to about 1.1 micrometer Ra. Particle sizes smaller than about 13 micrometer in diameter can result in a surface that is too smooth, allowing excessive toner to be metered under the doctor blade. Particle sizes larger than about 16 micrometers in diameter result in a surface that is too rough, allowing too little toner under the doctor blade. Also, larger particle sizes create peaks on the surface which scrape too much toner from the surface of the developer roller in a narrow area, resulting in vertical streaks on the printed page.

Any type of ceramic oxide grit may be used in the present invention. Examples of such materials include silicon carbide, aluminum oxide, diamond powder, zirconium dioxide and titanium dioxide within the particle size range specified herein. By being conductive throughout, as the conductive/grit lamination wears from the compliant backing member, the electrical properties of the doctor blade remain consistent.

The doctor blade embodiment of the present invention is shown in use in FIG. 2. In use, laminate (3) is compliant and is simply bent back at a position contiguous to the developer roller (6) as it rotates. The compliant backing member (3) and the resilient foam layer (2) provide the force which holds the conductive/grit laminate against the developer roller (6). The stiffness of the shim (10) in the direction that the roller is turning prevents the front edge (9) of the foam from deforming; this provides a prenip region having an optimal shape (8). This prenip region is nearly identical to that seen with a steel doctor blade. The stiffness of the shim also prevents the undesired long, radiused nip geometry and identically mimics the short, flat nip geometry of a steel blade (7). The stiffness that the shim provides is effective only in the process direction and not along the length of the blade (i.e., the length of the roller), thereby maintaining the overall flexibility of the blade. This is due to the narrowness of the blade (i.e., preferably about 4 mm), the width of the nip (i.e., from about 0.5 to about 1.5 mm, preferably about 1 mm), and the overall length of the blade (from about 230 to about 233 mm, preferably about 231.5 mm). The preferred thickness of the shim is about 0.014 inches (0.356 mm). The preferred material for the shim is polyester.

Variations in the form and in the materials used are readily visualized by one skilled in the art and would be within the contemplation of this invention. Coverage is sought as provided by law, with particular reference to the accompanying claims.

What is claimed is:

1. An electrically energized doctor blade for metering charged electrophotographic toner held on a developer roller by physically contacting a sector of said roller with a surface of said blade which is electrically charged, said blade comprising a flexible backing member, a support bar to position said blade adjacent to said roller, and a layer on said flexible backing member comprising means for conducting electrical charge from said layer to said support bar and a solid binder having grit particles dispersed throughout said solid binder, said layer being attached and electrically connected to said support bar by a conducting paste comprising from about 70% to about 96% of an elastomer which has a hardness of less than about 50 Shore A when dry, and from about 4% to about 30% of a particulate electrically conductive material dispersed in said elastomer, said flexible backing member being bendable to extend under said support bar to contact said layer with grit particles and said means for conducting with said sector of said developer roller during use.

2. The doctor blade according to claim 1 wherein said means for conducting is a conductive filler dispersed in said solid binder of said layer having grit particles on said flexible backing member, said layer having grit particles having an electrical resistance of less than about $2 \times 10^5$ ohms/cm$^2$.

3. The doctor blade according to claim 2 wherein the elastomer is selected from the group consisting of RTV silicones, rubber solution cement, latex rubber, moisture-curable polyurethane elastomers, ultraviolet-cured acrylics, and mixtures thereof.

4. The doctor blade according to claim 3 wherein the conductive material is selected from the group consisting of metal fillers, graphite, carbon black, and mixtures thereof.

5. The doctor blade according to claim 4 wherein the conducting paste provides an electrical resistance less than about $1 \times 10^5$ ohms/cm$^2$.

6. The doctor blade according to claim 5 wherein the elastomer is selected from the group consisting of RTV silicones, latex rubber, and mixtures thereof.

7. The doctor blade according to claim 6 wherein the conducting material is carbon black.

8. The doctor blade according to claim 7 wherein the conducting paste comprises from about 94% to about 96% RTV silicone and from about 4% to about 6% carbon black.

9. The doctor blade according to claim 8 which additionally comprises a resilient foam layer attached to the side of said support bar facing the developer roller, and a shim having a stiffness of from about 0.5 to about 31.0 inches of deflection/inch of length/pounds of force attached to the side of the resilient foam layer facing the developer roller, said flexible backing member, said means for conducting electrical charge and said layer with grit particles being bendable to extend under said foam layer and shim to contact said layer with grit and said means for conducting electrical charge with said sector of said developer roller during use.

10. The doctor blade according to claim 9 wherein the shim is placed at the front edge of the resilient foam layer.

11. The doctor blade according to claim 10 wherein the shim is made of a material selected from the group consisting of polyester, brass, stainless steel, beryllium copper, phosphorus bronze, and polycarbonate.

12. The doctor blade according to claim 11 wherein the shim is made from polyester.

13. The doctor blade according to claim 12 wherein the shim has a thickness of about 0.014 inch.

14. The doctor blade as in claim 1 in which a hole extends through said flexible backing member and said layer, and in which said layer on said flexible backing member is electrically connected to said support by said paste being located in said hole.

15. The doctor blade as in claim 1 in which a hole extends through said flexible backing member and said layer, and in which said layer on said flexible backing member is electrically connected to said support by said paste being located in said hole.

16. The doctor blade as in claim 3 in which a hole extends through said flexible backing member and said layer, and in which said layer on said flexible backing member is electrically connected to said support by said paste being located in said hole.

17. The doctor blade as in claim 4 in which a hole extends through said flexible backing member and said layer, and in which said layer on said flexible backing member is electrically connected to said support by said paste being located in said hole.

18. The doctor blade as in claim 5 in which a hole extends through said flexible backing member and said layer, and in which said layer on said flexible backing member is electrically connected to said support by said paste being located in said hole.

19. The doctor blade as in claim 6 in which a hole extends through said flexible backing member and said layer, and in which said layer on said flexible backing member is electrically connected to said support by said paste being located in said hole.

20. The doctor blade as in claim 7 in which a hole extends through said flexible backing member and said layer, and in which said layer on said flexible backing member is electrically connected to said support by said paste being located in said hole.

21. The doctor blade as in claim 8 in which a hole extends through said flexible backing member and said layer, and in which said layer on said flexible backing member is electrically connected to said support by said paste being located in said hole.

22. The doctor blade as in claim 9 in which a hole extends through said flexible backing member and said layer, and in which said layer on said flexible backing member is electrically connected to said support by said paste being located in said hole.

23. The doctor blade as in claim 10 in which a hole extends through said flexible backing member and said layer, and in which said layer on said flexible backing member is electrically connected to said support by said paste being located in said hole.

24. The doctor blade as in claim 11 in which a hole extends through said flexible backing member and said layer, and in which said layer on said flexible backing member is electrically connected to said support by said paste being located in said hole.

25. The doctor blade as in claim 12 in which a hole extends through said flexible backing member and said layer, and in which said layer on said flexible backing member is electrically connected to said support by said paste being located in said hole.

26. The doctor blade as in claim 13 in which a hole extends through said flexible backing member and said layer, and in which said layer on said flexible backing member is electrically connected to said support by said paste being located in said hole.

* * * * *